(12) United States Patent
Holden et al.

(10) Patent No.: US 12,235,228 B2
(45) Date of Patent: Feb. 25, 2025

(54) SPECTROMETER

(71) Applicant: EasyXAFS, LLC, Seattle, WA (US)

(72) Inventors: William Holden, Seattle, WA (US); Devon Mortensen, Seattle, WA (US)

(73) Assignee: EasyXAFS, LLC, Renton, WA (US)

( * ) Notice: Subject to any disclaimer, the term of this patent is extended or adjusted under 35 U.S.C. 154(b) by 0 days.

(21) Appl. No.: 17/754,624

(22) PCT Filed: Oct. 21, 2020

(86) PCT No.: PCT/US2020/056591
§ 371 (c)(1),
(2) Date: Apr. 7, 2022

(87) PCT Pub. No.: WO2021/081044
PCT Pub. Date: Apr. 29, 2021

(65) Prior Publication Data
US 2022/0349844 A1 Nov. 3, 2022

Related U.S. Application Data

(60) Provisional application No. 62/924,009, filed on Oct. 21, 2019.

(51) Int. Cl.
| | |
|---|---|
| *G01N 23/207* | (2018.01) |
| *G01N 23/085* | (2018.01) |
| *G01N 23/20016* | (2018.01) |
| *G01N 23/20025* | (2018.01) |
| *G01N 23/2209* | (2018.01) |
| *G01N 23/223* | (2006.01) |

(52) U.S. Cl.
CPC ....... *G01N 23/2076* (2013.01); *G01N 23/085* (2018.02); *G01N 23/20016* (2013.01); *G01N 23/20025* (2013.01); *G01N 23/2209* (2018.02); *G01N 23/223* (2013.01); *G01N 2223/041* (2013.01); *G01N 2223/076* (2013.01); *G01N 2223/079* (2013.01); *G01N 2223/0813* (2013.01); *G01N 2223/1016* (2013.01); *G01N 2223/32* (2013.01)

(58) Field of Classification Search
None
See application file for complete search history.

(56) References Cited

U.S. PATENT DOCUMENTS

| | | | | |
|---|---|---|---|---|
| 3,628,015 | A * | 12/1971 | Franks | G01N 23/2076 250/374 |
| 3,914,605 | A * | 10/1975 | Hara | G01N 23/205 378/189 |
| 4,446,568 | A * | 5/1984 | Williams | G01N 23/207 378/85 |
| 4,580,283 | A * | 4/1986 | Hornstra | G01N 23/223 378/85 |
| 4,637,041 | A * | 1/1987 | Brinkgreve | G01N 23/207 378/81 |

(Continued)

FOREIGN PATENT DOCUMENTS

| | | | | |
|---|---|---|---|---|
| DE | 4327129 A1 * | 3/1994 | | G01N 23/2076 |
| JP | 56079240 A * | 6/1981 | | |

*Primary Examiner* — Thomas R Artman
(74) *Attorney, Agent, or Firm* — Schneer IP Law

(57) ABSTRACT

The invention described herein is a spectrometer having components allowing remote orientation of crystal analyzer and detector.

23 Claims, 10 Drawing Sheets

(56) References Cited

U.S. PATENT DOCUMENTS

| | | | | |
|---|---|---|---|---|
| 4,807,268 | A * | 2/1989 | Wittry | G21K 1/06 378/82 |
| 4,882,780 | A * | 11/1989 | Wittry | G21K 1/06 378/85 |
| 5,438,613 | A * | 8/1995 | Gijzen | G01N 23/207 378/82 |
| 6,456,688 | B1 * | 9/2002 | Taguchi | G21K 1/06 378/80 |
| 10,416,099 | B2 * | 9/2019 | Yun | H01J 35/08 |
| 10,962,490 | B2 * | 3/2021 | Mortensen | G01N 23/20091 |
| 11,054,375 | B2 * | 7/2021 | Seidler | G01N 23/20091 |
| 11,796,490 | B2 * | 10/2023 | Seidler | G01N 23/2076 |
| 2017/0184520 | A1 * | 6/2017 | Mortensen | G01N 23/20008 |
| 2019/0011379 | A1 * | 1/2019 | Yun | H01J 35/12 |
| 2019/0011381 | A1 * | 1/2019 | Mortensen | G01N 23/207 |
| 2019/0257774 | A1 * | 8/2019 | Seidler | G01N 23/2076 |
| 2022/0003694 | A1 * | 1/2022 | Seidler | G01N 23/20091 |
| 2022/0349844 | A1 * | 11/2022 | Holden | G01N 23/2076 |

\* cited by examiner

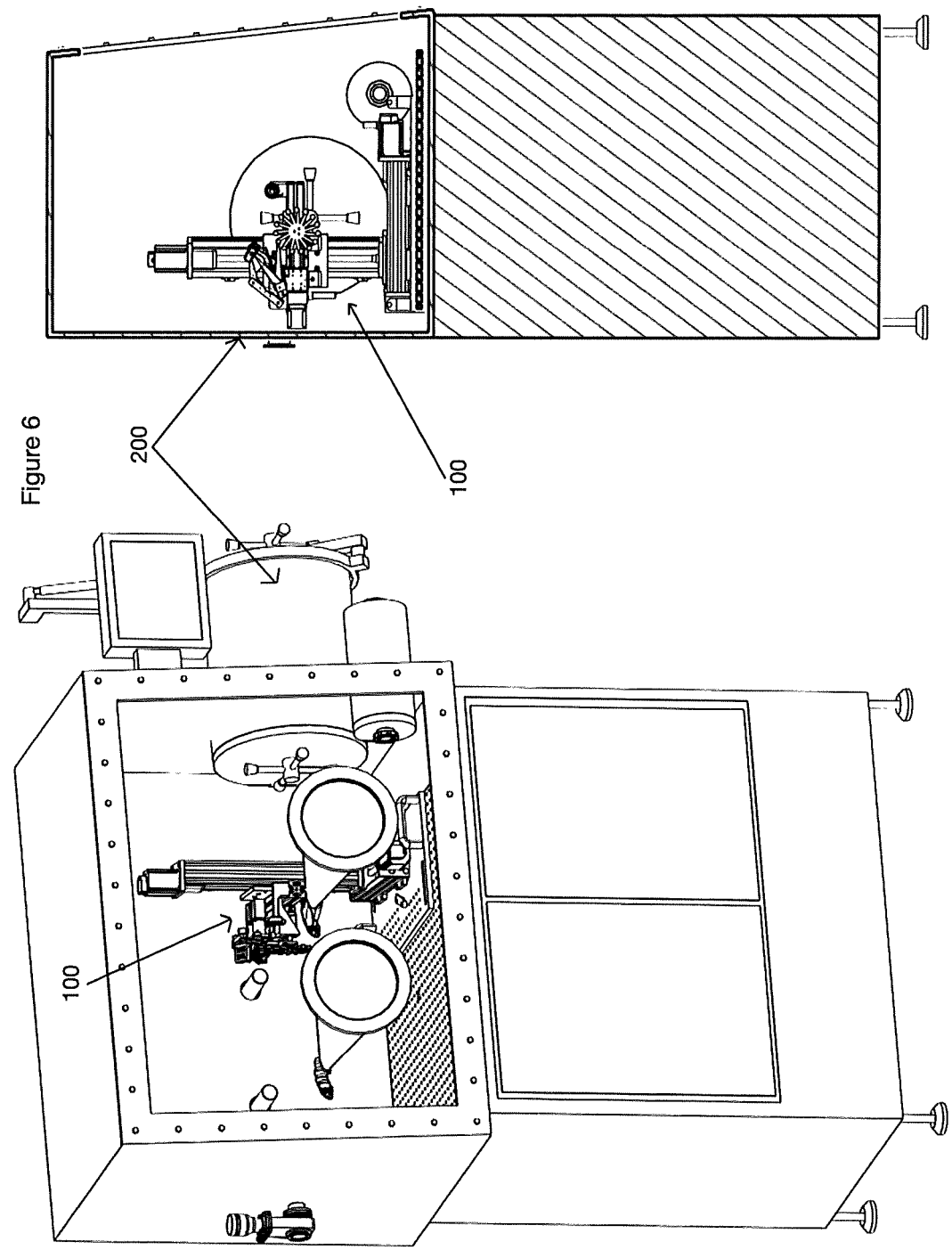

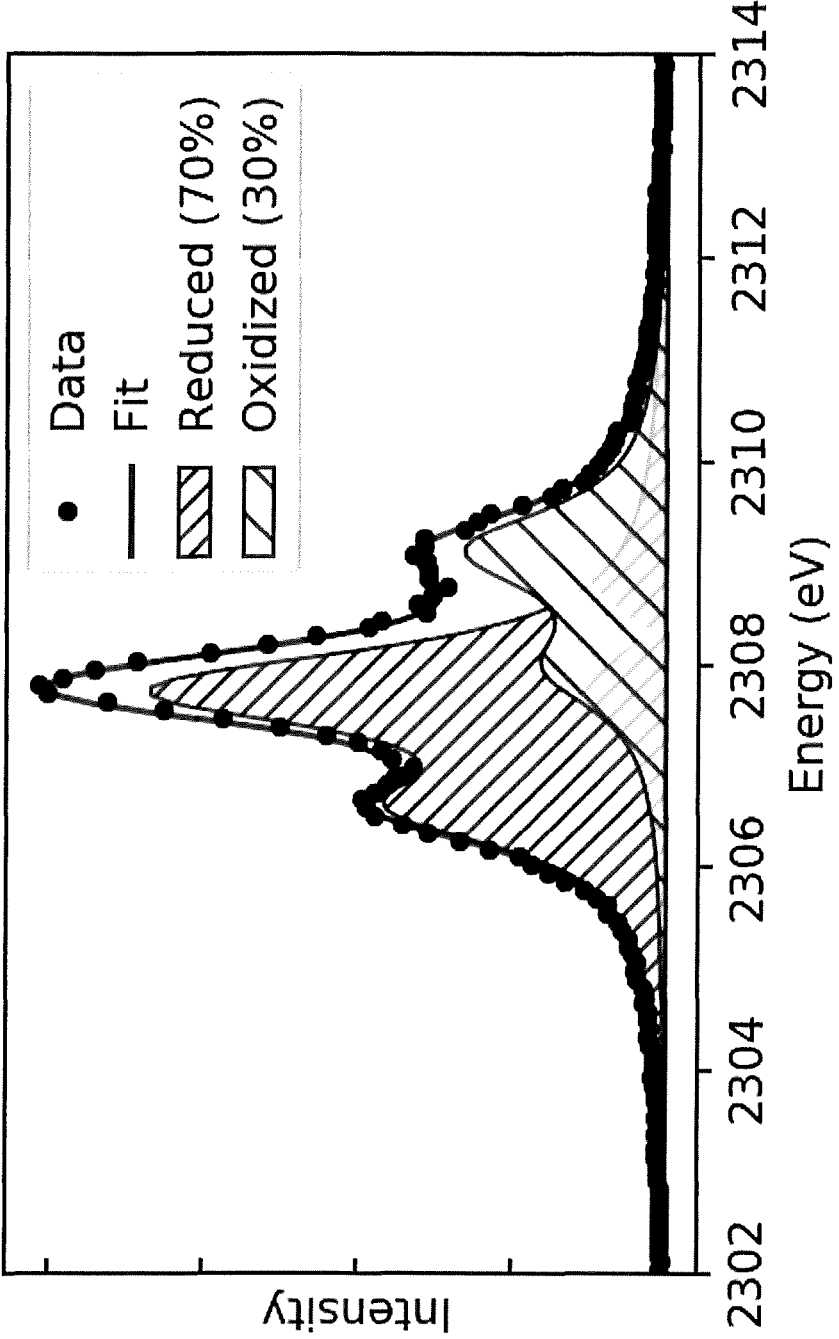

50° Bragg Angle

60° Bragg Angle

70° Bragg Angle

80° Bragg Angle

SPECTROMETER

CROSS-REFERENCES TO RELATED APPLICATIONS

This application takes priority to U.S. Provisional Application 62/924,009, filed on 21 Oct. 2019, and incorporated in its entirety by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

A spectrometer ("spectrometer") is used to isolate X-rays of interest for quantitative analysis. The general process of wavelength-dispersive fluorescence spectroscopy is to first stimulate the generation of X-rays characteristic of a particular element, either with incident X-rays from a source, such as an X-ray tube or synchrotron beam, or with incident particle radiation such as electron, proton, or ion beam. Once X-rays are generated in the sample, they are selected using a crystal analyzer with defined lattice spacing. When X-rays from the sample encounter the crystal analyzer at a specific angle, only those X-rays with wavelengths that satisfy Bragg's Law are diffracted. By controlling the position of the sample and the size of the illuminated region of the sample, X-rays of a band of energies, and being emitted from different regions of the sample, can interact with the crystal analyzer and undergo diffraction. In the Rowland circle geometry, the diffraction occurs in a manner such that the X-rays are spatially sorted by their energy when they are refocused onto the Rowland circle. Combined with a position-sensitive X-ray detector ("detector"), these refocused rays are measured by placing the detector on the circle, and, using the relationship between the refocused position and the energy, measured X-rays on the detector are assigned to particular energies. Alternatively, when used with a single-channel detector (not position-sensitive), the spectrometer can be operated in a point-to-point focus mode where a single X-ray energy is measured by the detector at each point.

In the Rowland circle geometry, the Rowland circle is defined by the location of the crystal analyzer, and the detector must ideally lie tangent to this circle. Once the Rowland circle is defined, the sample and detector must be positioned symmetrically relative to the crystal analyzer in order for the analyzed X-rays to be diffracted towards the detector. Commonly, the sample is fixed due to fixed location of the exciting X-rays or incident beam, and so the crystal analyzer and detector must both move to maintain the Rowland geometry as the angle of the crystal and detector is varied to change the Bragg angle and energy region being measured of the X-rays from the sample or source.

Thus, for a spectrometer to analyze various elemental fluorescence lines of samples, it requires constant reorientation of the crystal analyzer and detector. There is a need for a spectrometer that can orient these components precisely and to reorient as needed. A reorientation device also allows spectrometers to be reoriented in environments, such as a vacuum or inert-air glovebox or chamber, without disturbing the environment. In an embodiment, the inert-air glovebox or chamber is filled with helium. In another embodiment, the spectrometer is installed into a vacuum chamber or helium-filled chamber; such a spectrometer has two main applications. First, it may be used to measure the energy spectrum of the X-ray photons being emitted by the sample. When performed with very high energy resolution, this X-ray fluorescence spectroscopy is known as X-ray emission spectroscopy (XES). This can be performed because of X-rays incident on a sample, or also if electrons or other charged particles are incident on the sample, such as in electron microscopes or systems for proton induced XES. Second, the X-ray tube or source may be aimed into the entrance of the spectrometer so that a spectrum of the photon energies being emitted by the X-ray source itself forms on the detector. In this case, the sample is inserted between the source and analyzer or the analyzer and detector. The change in spectral intensity because of insertion of the sample can then be analyzed to determine the sample's X-ray absorption fine structure (XAFS). Described herein is a spectrometer having a platform which maneuvers and orients the crystal analyzer and detector.

BRIEF DESCRIPTION OF INVENTION

The invention described herein is a spectrometer having components allowing remote orientation of crystal analyzer and detector.

DESCRIPTION OF THE SEVERAL VIEWS OF THE DRAWINGS

Other features and advantages of the present invention will become apparent in the following detailed descriptions of the preferred embodiment with reference to the accompanying drawing. (to be finalized when drawings are finalized)

FIG. 6 is an environmental view of embodiment of the spectrometer;

FIG. 7c shows another example of characteristic X-ray spectrum acquired using the spectrometer;

DETAILED DESCRIPTION OF THE INVENTION

Figure 1:
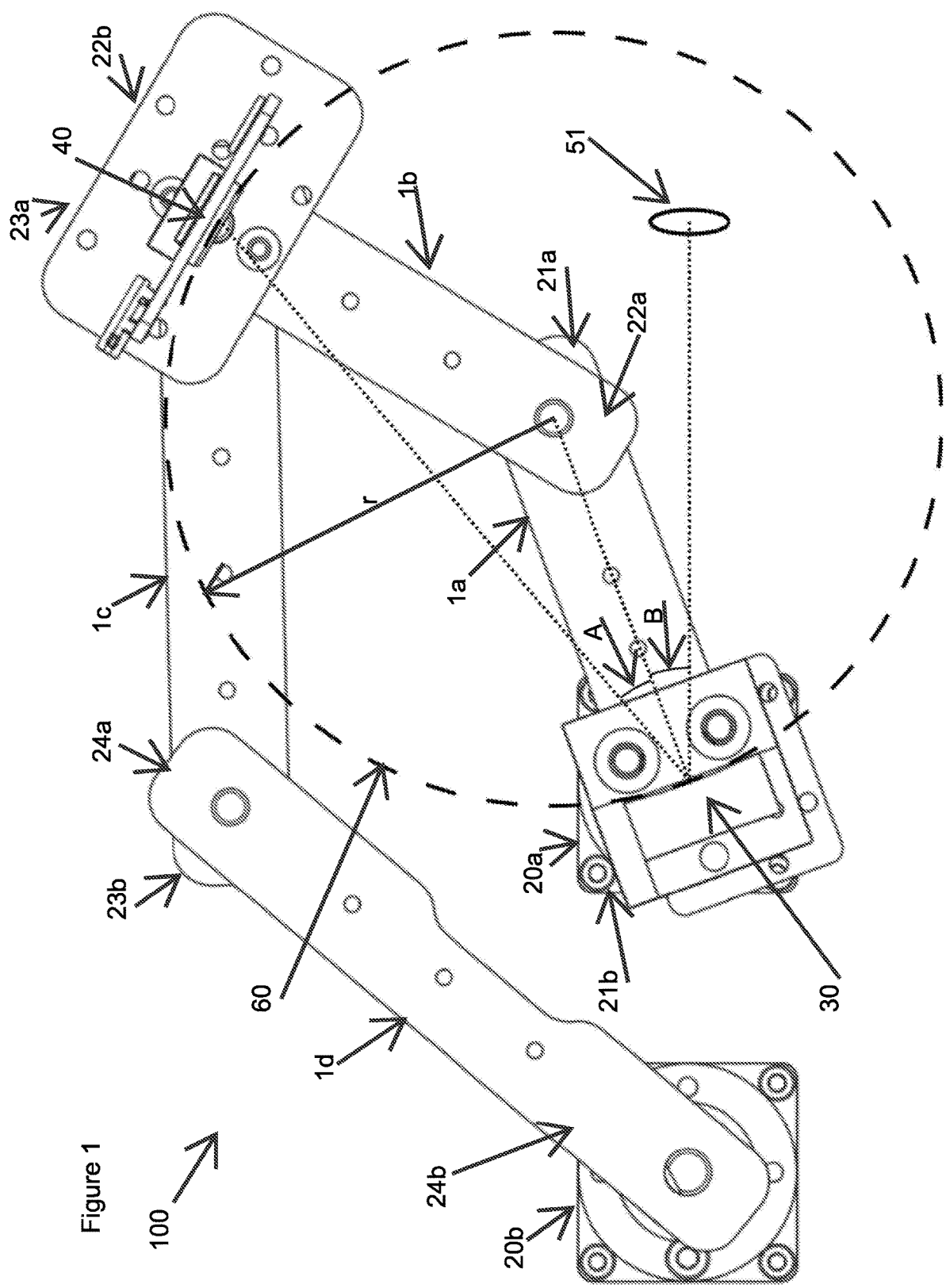
FIG. 1 is a side view of the spectrometer.
Figure 2A:
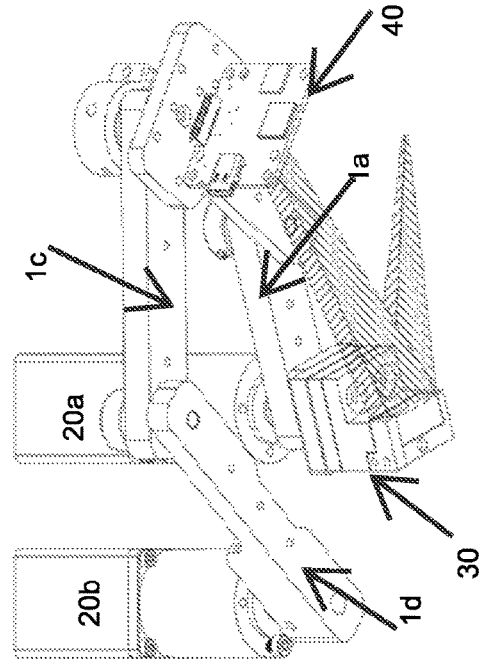
FIG. 2a is a top view of the spectrometer.
Figure 2B:
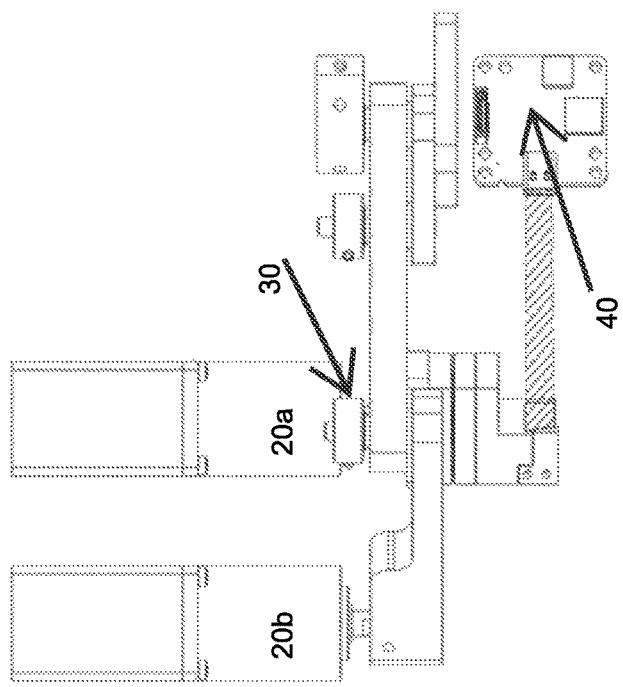
FIG. 2b is a perspective view of an embodiment of the spectrometer.
Figure 2C:
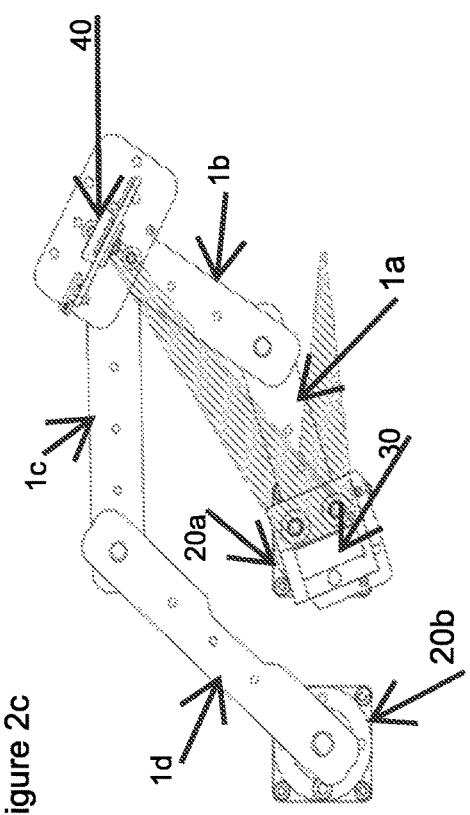
FIG. 2c is a side view of an embodiment of the spectrometer.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Referring to FIG. 1, according to an embodiment, a spectrometer (100) is comprised of a detector (40) and crystal analyzer (30) that may be positioned rotationally around a first axis; in some embodiments the axis is centered on a Rowland Circle (60) having radius r. Generally, the detector (40) and crystal analyzer (30) maybe positioned along the Rowland Circle (60), and independently of each other, so that a source (51) is within the region of acceptance for Bragg diffraction by crystal analyzer (30).

The crystal analyzer (30) is operably attached to a first arm (1a) whereby the position of the first arm (1a) is controlled by a first motor (20a). The first arm (1a) is comprised of a far end (21b) and a near end (21a). In an embodiment, the first motor (20a) is operably attached to the far end (21b) of the first arm (1a). The crystal analyzer (30) is operably attached to the far end (21b) of the first arm (1a). In an embodiment, the crystal analyzer (30) is mounted to the far end (21b) using any known mounting method. The first motor (20a) moves the first arm (1a) which moves the center of the Rowland Circle while keeping the crystal analyzer (30) tangential. In an embodiment, the crystal analyzer (30) is mounted in such a way that it can rotate with respect to its mount point. In an embodiment, the crystal analyzer is mounted in such a way that its radial position r can be adjusted such that the crystal analyzer is closer or further to the first axis. In an embodiment, the crystal analyzer (30) is of the Johann type, in which the surface of the crystal is curved to lie along a circle with size twice as large as the Rowland circle. In an embodiment, the crystal analyzer (30) is of the Johansson type, in which the crystal lattice planes are curved to have a radius twice as large as the Rowland circle, while the surface of the crystal is ground/manufactured to have the same radius as the Rowland circle. In an embodiment, a diffraction grating is used in place of a crystal analyzer.

The first arm (1a) is operably attached to a second arm (1b). The second arm (1b) has a near end (22a) and a far end (22b). The near end (21a) of the first arm (1a) is operably connected to the near end (22a) of the second arm (1b). The far end (22b) of the second arm (1b) is operably connected to a detector (40). In an embodiment, the detector (40) is mounted onto the second arm using any known mounting method. In an embodiment, the detector (40) is mounted to the second arm (1b) such that the detecting surface is perpendicular to the second arm (1b). In an embodiment, the detector is mounted in such a way that its radial position r can be adjusted.

The second arm (1b) is connected to a third arm (1c). The third arm (1c) has a near end (23a) and a far end (23b). The far end (22b) of the second arm (1b) is operably connected to the near end (23a) of the third arm (1c). In an embodiment, the second arm (1b) is operably connected to the third arm (1c) so that the detector (40) may move tangentially along the circle.

The third arm (1c) is connected to a fourth arm (1d). The fourth arm has a near end (24a) and a far end (24b). The near end (23a) of the third arm (1c) is operably connected to near end (24a) of the fourth arm (1d). The far end (24b) of the third arm (1d) is operably connected to a second motor (20b). In an embodiment, the second motor (20b) is mounted to the fourth arm (1d) by any known mounting method. The second motor (20b) moves the fourth arm (1d) rotationally.

In an embodiment, a computing device (not shown) controls the first motor (20a) and the second motor (20b). FIGS. 8a through 8d, show exemplary embodiments of the spectrometer at several Bragg Angles.

Referring to FIGS. 1, 2a, 2b, 2c, in an embodiment, the crystal analyzer (30) is configured to receive X-rays that are emitted by or transmitted through the sample (51). In an embodiment, the crystal analyzer (30) operates by selectively scattering, via Bragg diffraction, radiation within a particular wavelength/energy band based on the lattice spacing of the crystal analyzer (30) and orientation of the crystal analyzer (30) with respect to the sample (51). In another embodiment, the crystal analyzer (30) operates by selectively scattering, via Bragg diffraction, radiation within a particular wavelength/energy band based on the lattice spacing of the crystal analyzer (30) and orientation of the crystal analyzer (30) with respect to the radiation source (50). In an embodiment, the crystal analyzer (30) is shaped as a cylinder. In an embodiment the crystal analyzer (30) is shaped as a toroid. In an embodiment, the crystal analyzer (30) is shaped as a sphere. In an embodiment, the crystal analyzer (30) has a focusing circle having a diameter of approximately 10-20 cm. In another embodiment, the crystal analyzer (30) has a focusing circle having a diameter of approximately 20-100 cm. In an embodiment, the detector (40) is configured to detect counts, intensity, and/or energy/wavelength of X-rays that are diffracted by the crystal analyzer (30). One skilled in the art will recognize that the detector (40) may a position-sensitive or single-channel detector depending on the configuration. One skilled in the art will recognize that the crystal analyzer (30) and the detector (40) may each comprise a variety of materials, such that the desired configurations are accomplished.

Referring to FIGS. 1, 2a, 2b, and 2c, in an embodiment, the first arm (1a) and the second arm (1b) are configured such that the crystal analyzer (30) and the detector (40) remain tangent to the Rowland circle (60). In an embodiment, the first motor (20a) rotates the first arm (1a), and the second motor (20b) rotates the arm (1d), and subsequently the other linked arms (1b, 1c) such that the angle, A, between the detector (40) and crystal analyzer (30) may vary. In an embodiment, the first motor (20a) rotates the first arm (1a), the second motor (20b) rotations the arm (1d), and subsequently the other linked arms (1b, 1c) such that while the sample (51) remains stationary, angle, A, between the detector (40) and crystal analyzer (30) and angle, B, between the crystal analyzer (30) and the sample (51) remain equal. In an embodiment, the first motor (20a) or the second motor (20b) can be operated independently to adjust the position of the crystal analyzer (30) and the detector (40). Adjusting this angle allows X-rays from the source or sample (51) with different wavelengths to satisfy Bragg's law and be measured by the detector (40).

Figure 4A:
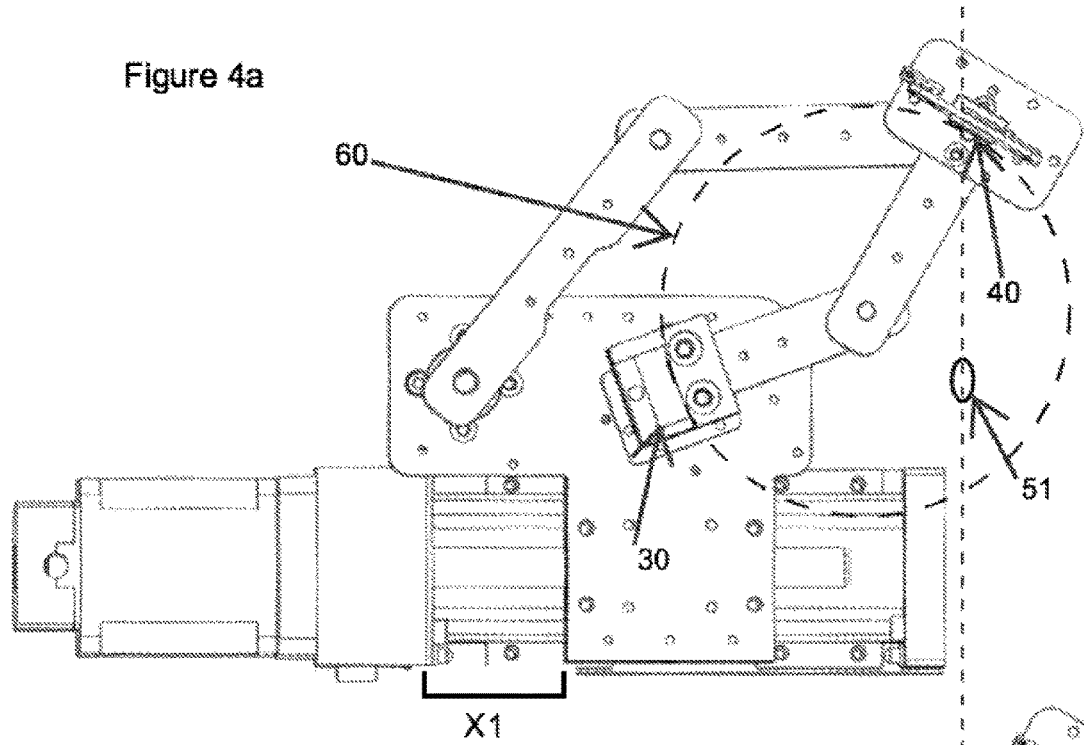
FIG. 4a is a side view of an embodiment of the spectrometer.
Figure 4B:
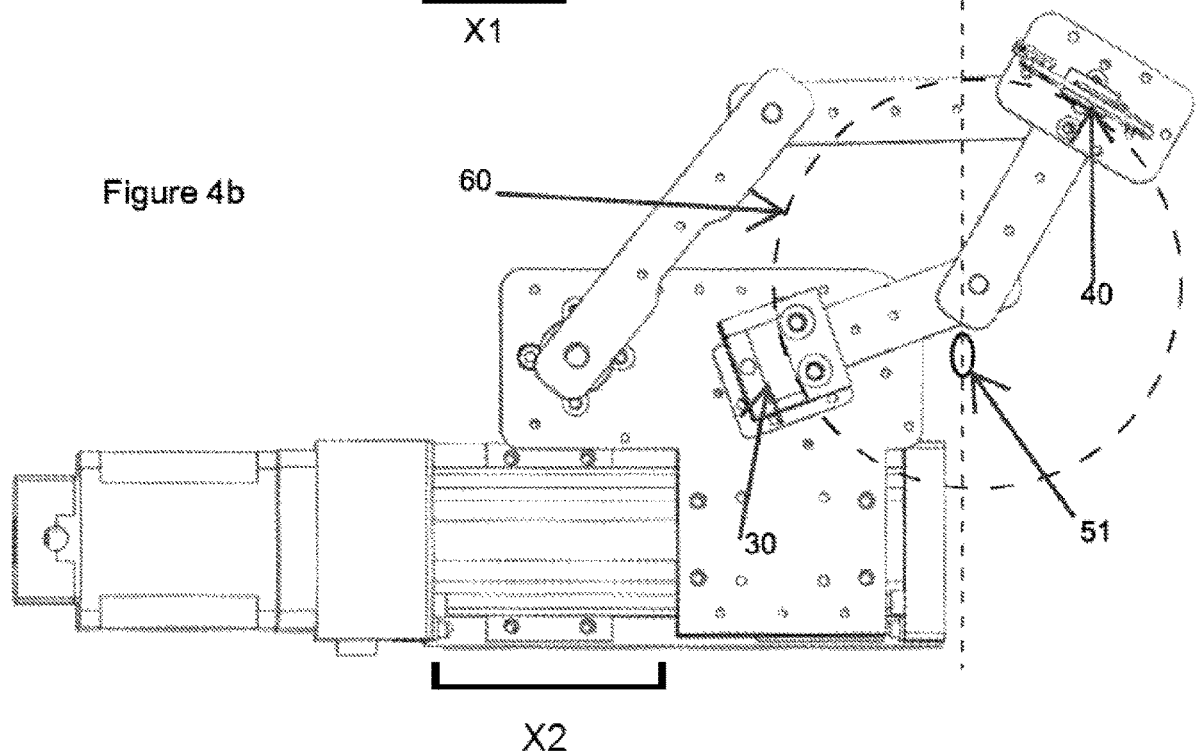
FIG. 4b is a side view of an embodiment of the spectrometer.

Referring to FIG. 4, in an embodiment, the spectrometer (100) is operably mounted onto a linear translation stage (70). The linear translation stage (70) moves the motorized spectrometer (100) from at least a first location, X1, to a second location, X2, changing the distance between the sample (51) and the crystal analyzer (30) while keeping the sample-crystal-detector angle constant. Referring to FIG. 6, in an embodiment the spectrometer (100) is housed in an inert-air glovebox (200). In an embodiment the spectrometer (100) is housed in a vacuum chamber or a chamber filled with helium. In an embodiment, the spectrometer (100) is oriented such that the Rowland circle is on a vertical plane. In an embodiment, the spectrometer (100) is oriented such that the Rowland circle is on a horizontal plane.

Figure 3:
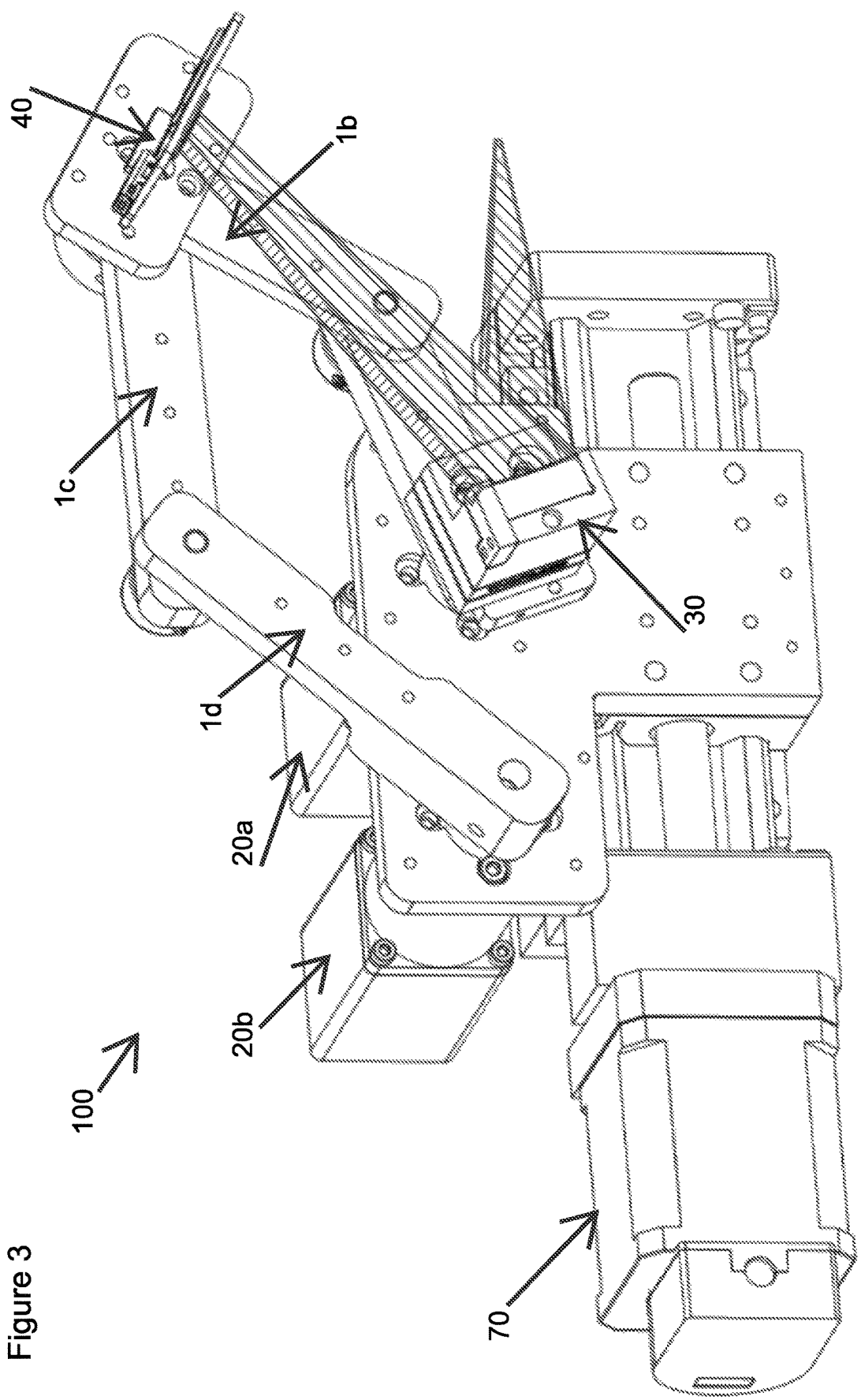
FIG. 3 is a side view an embodiment of the spectrometer.
Figure 5:
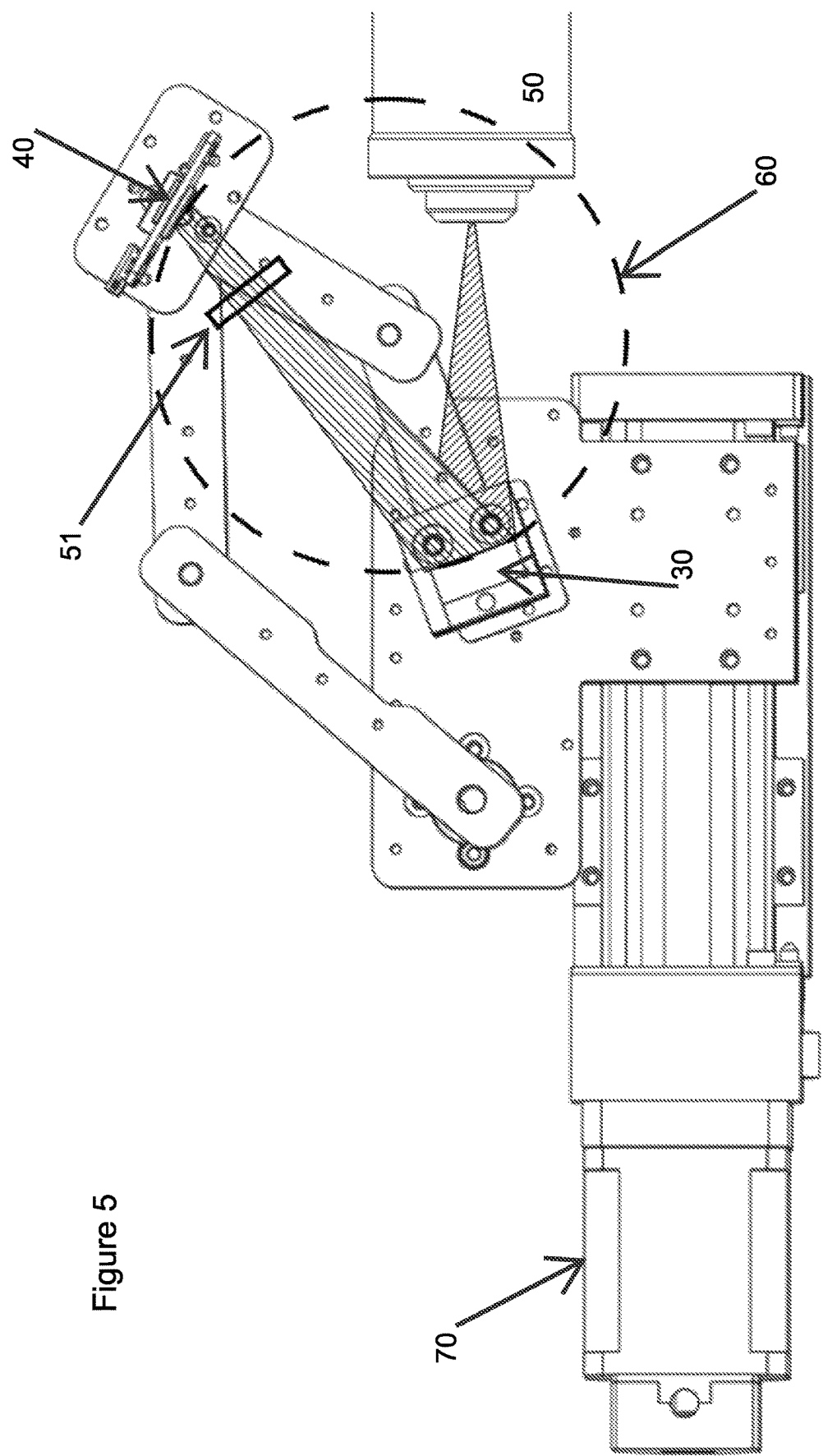
FIG. 5 is a side view of an embodiment of the spectrometer.

Referring to FIGS. 3-5, in an embodiment, the radiation source (50) is may be an X-ray tube, synchrotron, laser plasma x-ray source, scanning electron microscope, proton-beam or ion-beam. The radiation source (50) may be configured to emit X-rays towards the sample (51) such that the radiation source (50) causes the sample (51) to emit radiation toward the crystal analyzer (30). In this embodiment, the detector (40) measures the X-ray emission spectrum of the sample (51). As used here, the sample (51) may be any material. One skilled in the art will recognize that when referencing the sample (51), it is to be understood that the sample (51) is operably connected to a radiation source whether or not the radiation source is explicitly referenced.

Referring to FIG. 5, in an embodiment, the radiation source (50) is the form of an X-ray tube. In an embodiment, the radiation source (50) may be configured to emit X-rays towards the crystal analyzer (30), and the sample (51) may be placed between the radiation source (50) and the crystal analyzer (30), or between the crystal analyzer (30) and detector (40). Comparison of the signal on the detector (40) with and without the sample (51) present allows determination of the X-ray absorption fine structure of the sample (51). In other embodiments, the radiation source (50) may take the form of a synchrotron, laser plasma x-ray source.

In an embodiment, the spectrometer is utilized to study actinide elements. In an embodiment, the spectrometer is utilized to study air-sensitive electrode materials for electrical energy storage. In an embodiment, the spectrometer is utilized to study air-sensitive materials for chemical catalysis.

In an embodiment, a computing device is programmed to control the motors (20a, 20b), and subsequently the arms (1a, 1b, 1c, 1d) such that a plurality of angles between the crystal analyzer (30) and sample (51) or radiation source (50) can be achieved. In an embodiment, the computing device is preprogrammed to control the motors (20a, 20b) to orient the crystal analyzer (30) and detector (40) to defined positions such as particular energies of elemental emission lines. In an embodiment, the second motor (1b) rotates the fourth arm (1d) and consequently the other linked arms (1c, 1b, 1a) such that the detector (40) is moved, but the crystal analyzer (30) remains stationary.

Figure 7A:
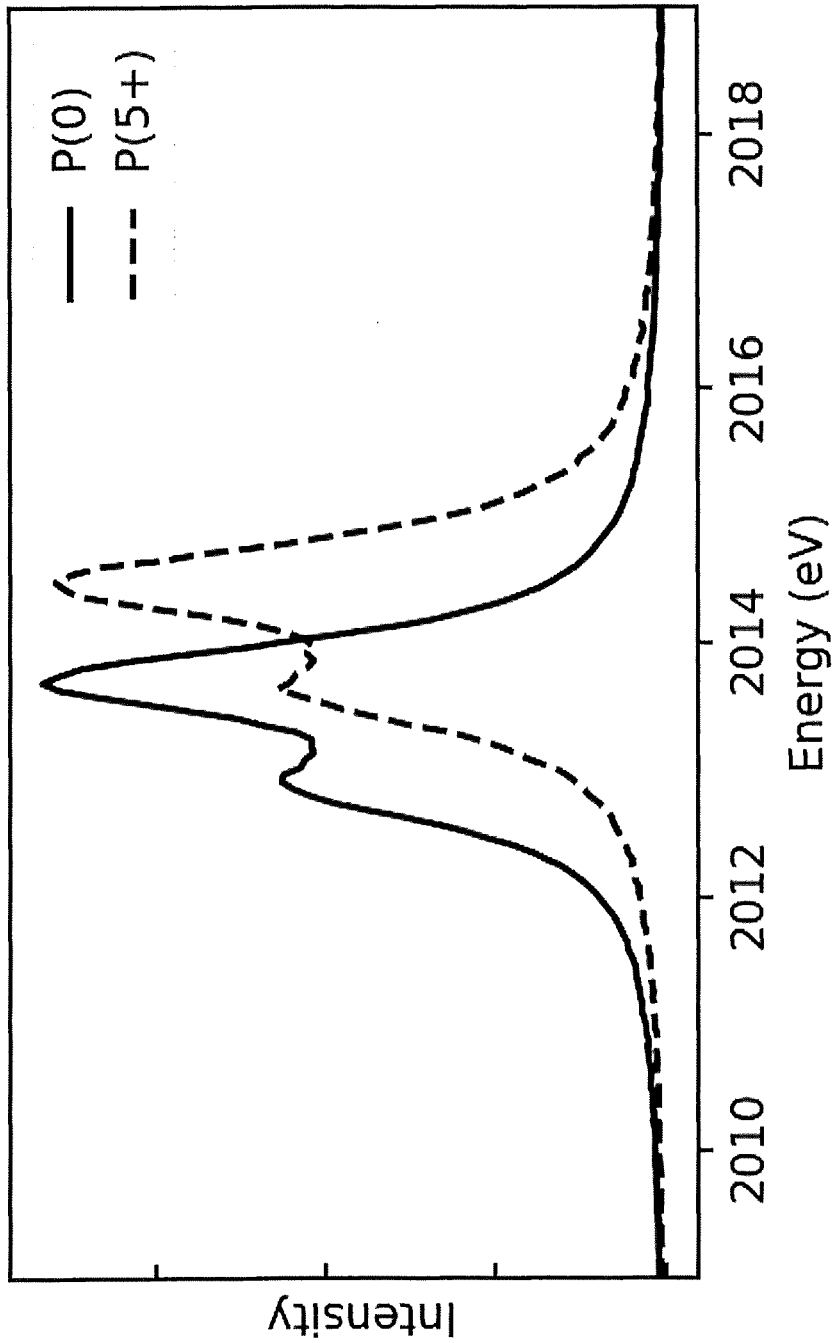
FIG. 7a shows an example of characteristic X-ray spectra acquired using the spectrometer.
Figure 7B:
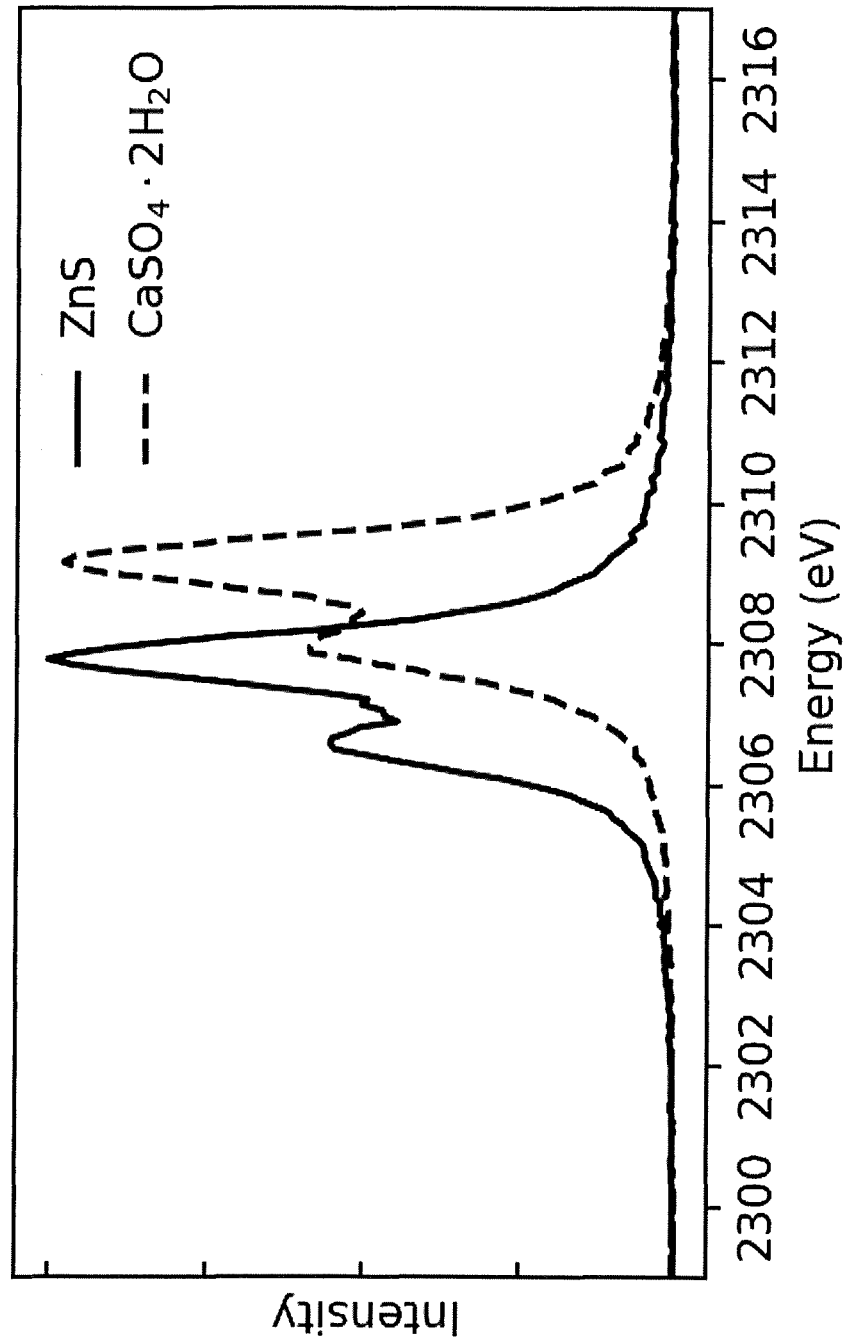
FIG. 7b shows another example of characteristic X-ray spectrum acquired using the spectrometer.
Figure 8A:
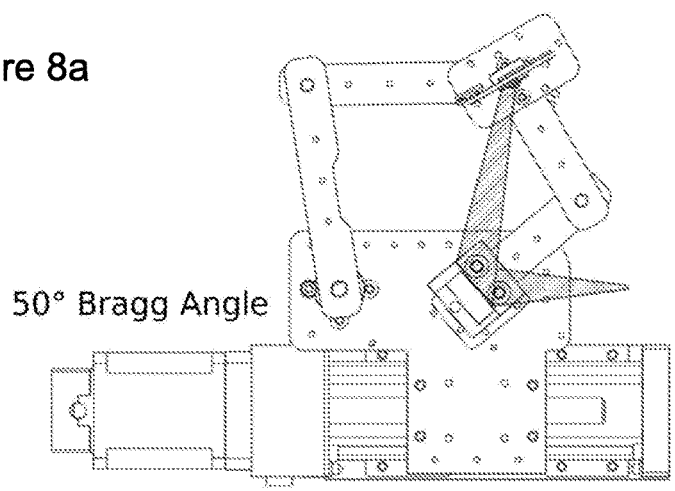
FIG. 8a is an exemplary embodiment of the spectrometer showing an 80° Bragg Angle.
Figure 8B:
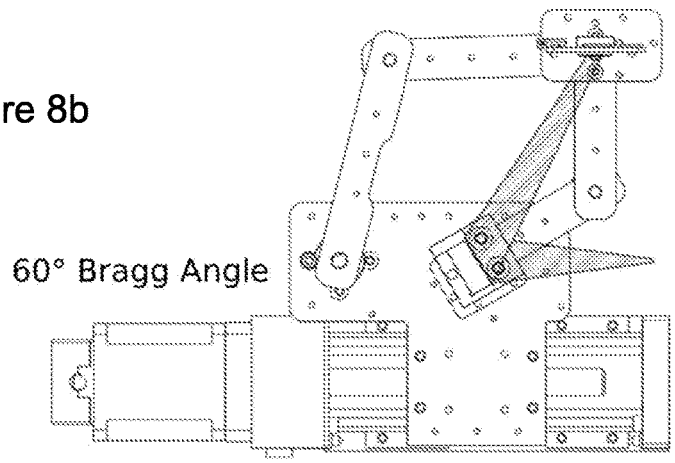
FIG. 8b is an exemplary embodiment of the spectrometer showing a 70° Bragg Angle.
Figure 8C:
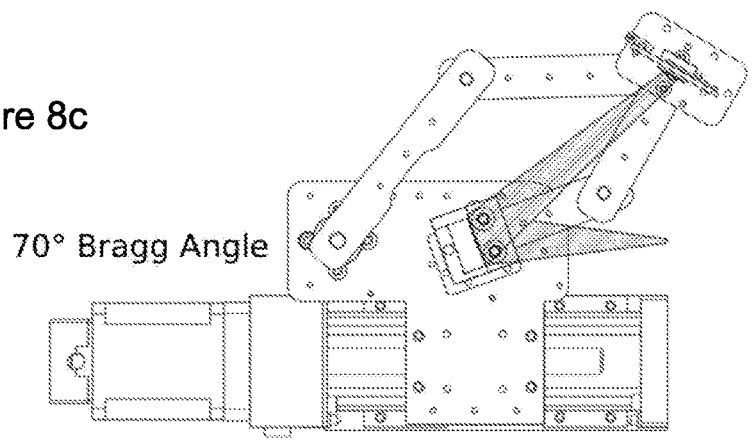
FIG. 8c is an exemplary embodiment of the spectrometer showing a 60° Bragg Angle.
Figure 8D:
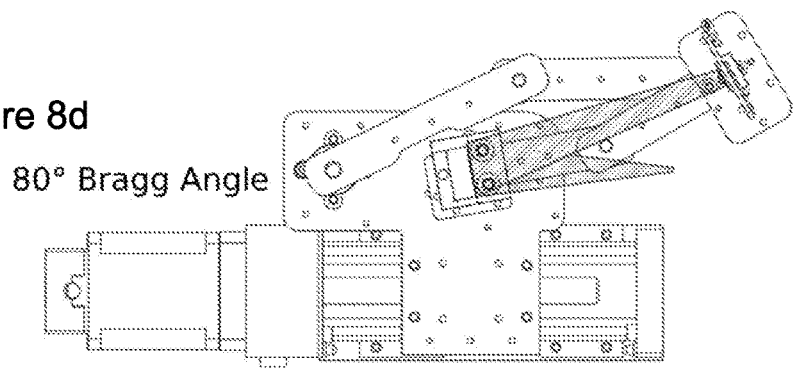
FIG. 8d is an exemplary embodiment of the spectrometer showing a 50° Bragg Angle.

The high-resolution spectra of FIGS. 7a and 7b were obtained utilizing the spectrometer (100) and utilizing the motorization to tune to different energy ranges (i.e. emission lines). In an exemplary embodiment, the samples are compounds containing either phosphorus or sulfur. For phosphorus and sulfur, the Kα spectrum consists of two closely spaced peaks. For phosphorus compounds, the energy separation is ~0.85 eV, and in sulfur compounds the energy separation is ~1.24 eV. The clear ability to resolve these two distinct peaks in the spectra demonstrates an energy resolution of <1 eV.

FIGS. 7a and 7b further show the shift in energy that occurs between the samples with a very low oxidation (e.g. ZnS where S=−2 oxidation state), and the samples with a high oxidation state (e.g. $CaSO_4.2H_2O$ where S=+6 oxidation state). For phosphorus, this energy shift is ~0.8 eV, and for sulfur this shift is ~1.35 eV. This measurement provides the ability to determine speciation in samples of mixed oxidation state. FIG. 7c illustrates the detection of both oxidation states, where the sample, which was initially CoS, shows some sulfur was oxidized to $SO_4^{2-}$. In an embodiment, the measurements of the spectrometer are used to determine the oxidation state distribution, e.g. oxidized and reduced fractions, of phosphorus and sulfur.

While various example aspects and example embodiments have been disclosed herein, other aspects and embodiments will be apparent to those skilled in the art. The various example aspects and example embodiments disclosed herein are for purposes of illustration and are not intended to be limiting.

We claim as our invention:

1. A spectrometer comprising:
   a detector, a crystal analyzer, and a linear translation stage;
   wherein the crystal analyzer is operably attached to a first arm;
   wherein the detector is operably attached to a second arm;
   wherein the first arm and the second arm are linked at an axis;
   wherein the detector moves rotationally around the axis; and
   wherein the axis is centered on a Rowland Circle;
   wherein the linear transition stage is configured to move the spectrometer from at least one first location to at least one second location, thereby varying a distance between a sample and the crystal analyzer while maintaining a constant angle between the sample and the detector.

2. The spectrometer of claim 1, wherein the first arm and the second arm are arranged so that the crystal analyzer and detector are tangent to the Rowland circle.

3. The spectrometer of claim 1, wherein the Rowland circle is on a vertical plane.

4. The spectrometer of claim 1, wherein the Rowland circle is on a horizontal plane.

5. The spectrometer of claim 1, wherein the sample is located along a radiation path between a source and the crystal analyzer.

6. The spectrometer of claim 1, wherein the sample is located along a radiation path between the crystal analyzer and the detector.

7. The spectrometer of claim 1, wherein the sample is within a region of acceptance for Bragg diffraction by the crystal analyzer.

8. The spectrometer of claim 1, wherein the radiation source is within a region of acceptance for Bragg diffraction by the crystal analyzer.

9. The spectrometer of claim 1, wherein the spectrometer is used to study actinide elements.

10. The spectrometer of claim 1, wherein the crystal analyzer has a cylindrical shape.

11. The spectrometer of claim 1, wherein the crystal analyzer has a toroidal shape.

12. The spectrometer of claim 1, wherein the crystal analyzer has a spherical shape.

13. The spectrometer of claim 1, wherein the Rowland circle has a diameter of 10 cm-100 cm.

14. The spectrometer of claim 1, wherein the spectrometer is located inside an inert-gas chamber.

15. The spectrometer of claim 14, wherein the spectrometer is used to study air-sensitive electrode materials for electrical energy storage.

16. The spectrometer of claim 14, wherein the spectrometer is used to study air-sensitive materials for chemical catalysis.

17. The spectrometer of claim 1, wherein the spectrometer is located inside of a vacuum chamber.

18. The spectrometer of claim 1, wherein the spectrometer is located inside a chamber filled with helium.

19. The spectrometer of claim 1, wherein the crystal analyzer is of the Johann type.

20. The spectrometer of claim 1, wherein the crystal analyzer is of the Johansson type.

21. The spectrometer of claim 1, wherein at least the first arm is operably attached to a motor.

22. The spectrometer of claim 1, wherein the spectrometer is used for determining an oxidation state distribution.

23. The spectrometer of claim 1 wherein the crystal analyzer comprises a diffraction grating that is operably attached to the first arm.

* * * * *